May 5, 1931.   E. I. NOXON   1,803,344
MOLDING MACHINE
Filed Oct. 5, 1928
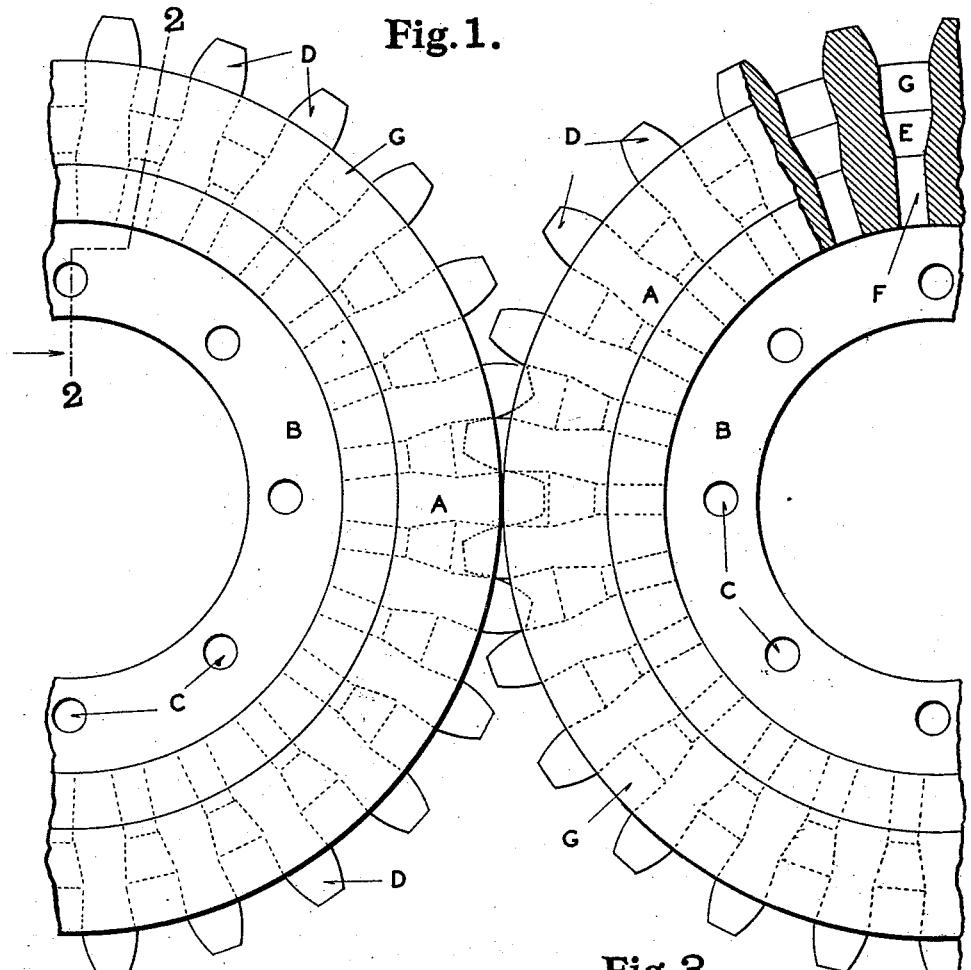
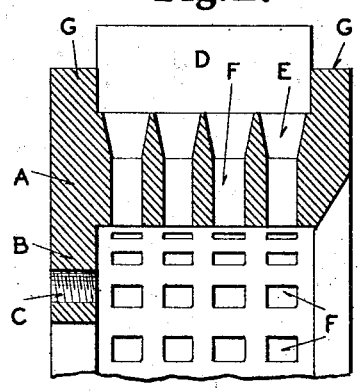
Inventor
ELWIN I. NOXON
By E. E. Huffman
Att'y.

Patented May 5, 1931

1,803,344

UNITED STATES PATENT OFFICE

ELWIN I. NOXON, DECEASED, LATE OF ST. LOUIS, MISSOURI, BY DOROTHY V. NOXON, OF WEBSTER GROVES, MISSOURI, GEORGE A. NOXON, OF ST. LOUIS, MISSOURI, AND MISSISSIPPI VALLEY TRUST COMPANY, OF ST. LOUIS, MISSOURI, EXECUTORS, ASSIGNORS TO RALSTON PURINA COMPANY, OF ST. LOUIS, MISSOURI, A CORPORATION OF MISSOURI

MOLDING MACHINE

Application filed October 5, 1928. Serial No. 310,602.

This invention relates to a molding machine for forming prismatic forms, preferably of square cross section, from plastic material. It is especially designed for molding such forms from material containing cereals or other alimentary substances.

The invention is specifically for improvement in the form of machine shown and described in United States Letters Patent No. 1,127,925 granted to George R. Schueler February 9, 1915. The object of the invention is to provide improved means for preventing the escape of the plastic material at the sides of the teeth. This is accomplished by providing each of the molding drums with a pair of shrouds overlapping the teeth of the other drum and preferably extending to the pitch line of the teeth so that the shrouds of the two drums have rolling contact with each other as the drums revolve.

In the accompanying drawings, which illustrate so much of one form of machine as is necessary to disclose the invention, Figure 1 is a side elevation of a pair of cooperating mold drums, a part of one of the drums being shown in section; Figure 2 is a section taken on the line 2—2 of Figure 1; and Figure 3 is an enlarged edge view of a portion of one of the drums.

The cooperating molding members of this machine consist of a pair of hollow drum shaped parts A, the hollow interiors of which form central delivery chambers for the discharge of the molded material. Each of the parts A is provided with an inwardly extending flange B provided with bolt holes C by means of which it may be secured to the drum shaft (not shown) in a manner similar to that shown in the Schueler patent above referred to.

On each of the drums are teeth D meshing with the teeth of the other drum. These teeth instead of being of different contour in the two drums, as in the Schueler machine, are of the same form so that the two drums are exact duplicates of each other, thus reducing the cost of manufacture. Extending from the roots of the teeth to the central delivery chamber are radial molds. As shown in the drawings, four such molds are provided for each tooth but this number may be varied as desired. Each mold comprises an outer tapered part E and an inner straight part F.

In order to avoid the use of stationary cheek pieces for retaining the material at the sides of the teeth, which cheek pieces are subject to constant wear while the machine is in operation, each drum is provided with a pair of shrouds G. These shrouds extend to the pitch line of the teeth so that the shrouds on one drum have rolling contact with those on the other, as shown in Figure 1. The shrouds thus effectively prevent the escape of the material at the point of compression and so obviate the use of the stationary cheek pieces for this purpose. While it is possible to form the shrouds independently of the drums and fasten them in position thereon, it has been found by experience that it is difficult, if not impossible, to secure them in position so firmly that they are not liable to work loose from the extreme pressure of the material to which they are constantly subjected during the operation of the machine. It is therefore preferred to form the shrouds integral with the drums as shown in the drawings.

Having fully described the invention, what we claim as new and desire to secure by Letters Patent of the United States is:

1. In a device of the class described, the combination of a pair of rotary members provided with intermeshing teeth, each of said members having a series of radial molds communicating with the spaces between its teeth, said members each being provided with closure means at each end rotating therewith and terminating at the pitch line of the teeth to form compression chambers between said teeth and to slidingly cooperate with the sides of the teeth of the other member.

2. In a device of the class described, the combination of a pair of rotary mold drums provided with inter-current teeth, said teeth being rectangular in cross-section in planes tangent to their pitch line, each of said drums having a series of radial molds communicating with the spaces between its teeth and also having means at each end rotating therewith and terminating at the pitch line of the teeth to laterally close the spaces between the lower parts of said teeth and form compression chambers, the ends of the teeth of each drum being dimensioned to close and progressively decrease the volume of said chambers in the other drum during their intermeshing engagement therewith.

In testimony whereof, we have hereunto affixed our signatures, this the 27th day of September, 1928.

DOROTHY V. NOXON,
GEORGE A. NOXON,
MISSISSIPPI VALLEY TRUST COMPANY,
By CHAS. HERMAN,
    *Asst. Trust Officer*,
*Executors of the Last Will and Testament of Elwin I. Noxon, Deceased.*